United States Patent [19]

Iijima

[11] Patent Number: 5,288,978
[45] Date of Patent: Feb. 22, 1994

[54] MUTUAL AUTHENTICATION SYSTEM AND METHOD WHICH CHECKS THE AUTHENTICITY OF A DEVICE BEFORE TRANSMITTING AUTHENTICATION DATA TO THE DEVICE

[75] Inventor: Yasuo Iijima, Yokohama, Japan

[73] Assignee: Kabushiki kaisha Toshiba, Kawasaki, Japan

[21] Appl. No.: 769,719

[22] Filed: Oct. 2, 1991

[30] Foreign Application Priority Data

Oct. 5, 1990 [JP] Japan .................................. 2-266261

[51] Int. Cl.⁵ .............................................. G06F 15/20
[52] U.S. Cl. ...................................... 235/380; 380/23
[58] Field of Search ............... 235/380, 382, 381, 379, 235/375; 380/23, 24, 25

[56] References Cited

U.S. PATENT DOCUMENTS

| | | | |
|---|---|---|---|
| 4,650,975 | 3/1987 | Kitchener | 380/25 X |
| 4,710,613 | 12/1987 | Shigenaga | 235/380 |
| 4,742,351 | 5/1988 | Suzuki | 235/380 X |
| 4,746,788 | 5/1988 | Kawana | 235/380 |
| 5,003,594 | 3/1991 | Shinagawa | 235/382 X |
| 5,036,461 | 7/1991 | Elliott et al. | 235/380 X |
| 5,068,894 | 11/1991 | Hoppe | 380/24 X |
| 5,109,152 | 4/1992 | Takagi et al. | 235/380 |

*Primary Examiner*—David C. Nelms
*Assistant Examiner*—John R. Lee
*Attorney, Agent, or Firm*—Cushman, Darby & Cushman

[57] ABSTRACT

A mutual authentication system authenticates a first electronic device and a second electronic device by transmitting authentication data between the first and second electronic devices. In this system, the second electronic device transmits a first authentication data to the first electronic device. In the first electronic device, the legitimacy of the second electronic device is determined based on the first authentication data transmitted from the second electronic device. The first electronic device also transmits a second authentication data, which is used for determining the legitimacy of the first electronic device, to the second electronic device. When the second electronic device is not determined to be legitimate by the first electronic device, the first electronic device does not transmit the second authentication data to the second electronic device.

14 Claims, 9 Drawing Sheets

MUTUAL AUTHENTICATION SYSTEM AND METHOD WHICH CHECKS THE AUTHENTICITY OF A DEVICE BEFORE TRANSMITTING AUTHENTICATION DATA TO THE DEVICE

BACKGROUND OF THE INVENTION

1. Field of the Invention

The present invention relates to a system and method for effecting mutual authentication between a portable electronic device such as an IC card having an IC (integrated circuit) chip enclosed therein and a host device or terminal device.

2. Description of the Related Art,

In Order to increase the security of the data stored on an IC card, the provision of a cipher algorithm within the IC card and the use of this to execute mutual authentication between an external terminal device, such as a host computer, and the IC card was conceived. In this mutual authentication system, first, both the IC card and the terminal device were designed to possess identical key data and identical initial data at a specified timing. Then, using a specified command as the trigger, the result of calculating the key data and the initial data as a parameter is transmitted by one of the IC card and terminal device to the other one as authentication data. The side which receives these authentication data (the IC card) also carries out the calculation of the key data and the initial data as a parameter and executes a comparison between that result and the authentication data which has been transmitted to it. Thus, mutual authentication is carried out by the IC card and the terminal device alternately executing the above.

Thus, after the IC card has determined "the legitimacy of the terminal device" based on the authentication data which have been transmitted from the terminal device, data are transmitted from the IC card to the terminal device so that the terminal device may judge "the legitimacy of the IC card". However, the IC card's authentication data are transmitted to the terminal device regardless of the result of "the legitimacy of the terminal device". Thus, there is a problem in that the authentication data of the IC card were acknowledged even for terminal devices which were not legitimate.

As described above, in prior art mutual authentication systems, after determining the legitimacy based on the authentication data transmitted from a terminal device to an IC card, authentication data were transmitted from the IC card to the terminal device regardless of the result. Thus, there was a problem concerning the security of the authentication data of the IC card.

SUMMARY OF THE INVENTION

It is an object of the present invention to provide a mutual authentication system which increases the security of the authentication data of a portable type electronic device or IC card.

It is another object of the present invention to provide a mutual authentication method which increases the security of the authentication data of a portable type electronic device or IC card.

According to the present invention there is provided a mutual authentication system for authenticating a first electronic device and a second electronic device by transmitting authentication data between the first and second electronic devices, comprising first transmission means for transmitting a first authentication data from the second electronic device to the first electronic device; determination means provided in the first electronic device for determining the legitimacy of the second electronic device based on the first authentication data transmitted from the second electronic device; second transmission means for transmitting a second authentication data, which is used for determining a legitimacy of the first electronic device, from the first electronic device to the second electronic device; and inhibition means for inhibiting the operation of the second transmission means when the second electronic device is not determined to be legitimate by the determination means.

Further, according to the present invention there is provided a mutual authentication method for authenticating a first electronic device and a second electronic device by transmitting authentication data between the first and second electronic devices, comprising the steps of transmitting a first authentication data from the second electronic device to the first electronic device; determining the legitimacy of the second electronic device based on the first authentication data transmitted from the second electronic device; transmitting a second authentication data, which is used for determining the legitimacy of the first electronic device, from the first electronic device to the second electronic device; and inhibiting the transmitting of the second authentication data when the second electronic device is not determined to be legitimate by the determining step.

DETAILED DESCRIPTION OF THE PREFERRED EMBODIMENTS

There will now be described an embodiment of the present invention with reference to the drawings.

Figure 1:
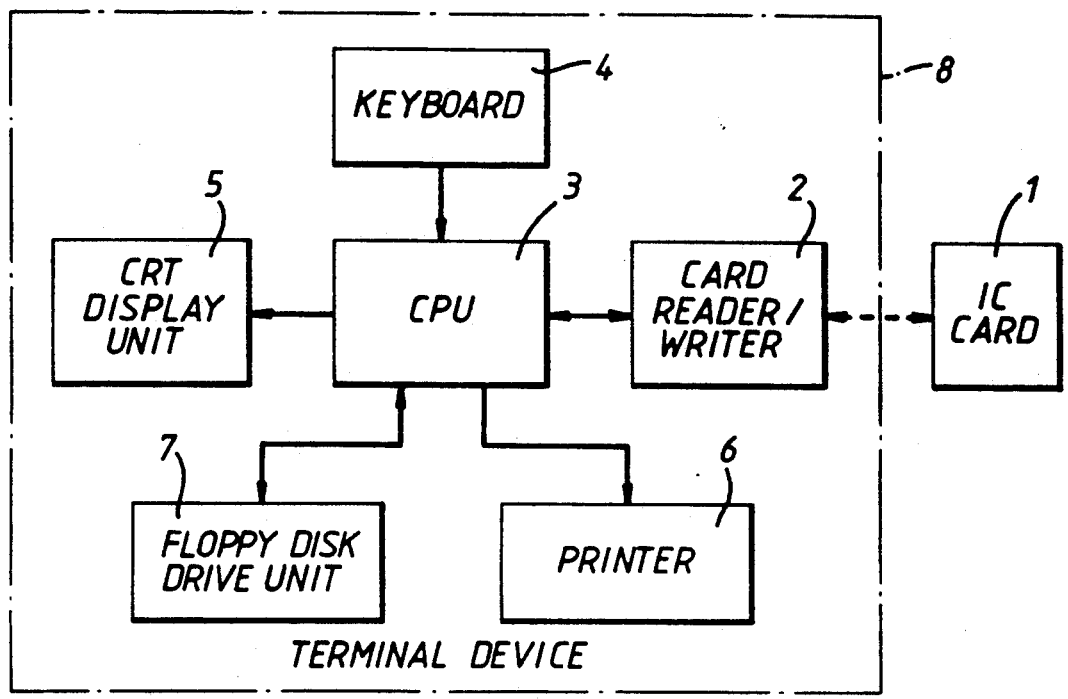
FIG. 1 is a block diagram showing one embodiment of a mutual authentication system according to the present invention.

FIG. 1 shows an example of the construction of a terminal device 8 (second electronic device) used as a host device for dealing with an IC card I (first electronic device) used as a portable type electronic device according to the present invention. That is, terminal device 8 permits IC card 1 to be connected to a CPU 3 functioning as a control section via a card reader/writer 2 and is constructed by connecting a keyboard 4, CRT display unit 5, printer 6 and floppy disk drive unit 7 to CPU 3.

Figure 2:
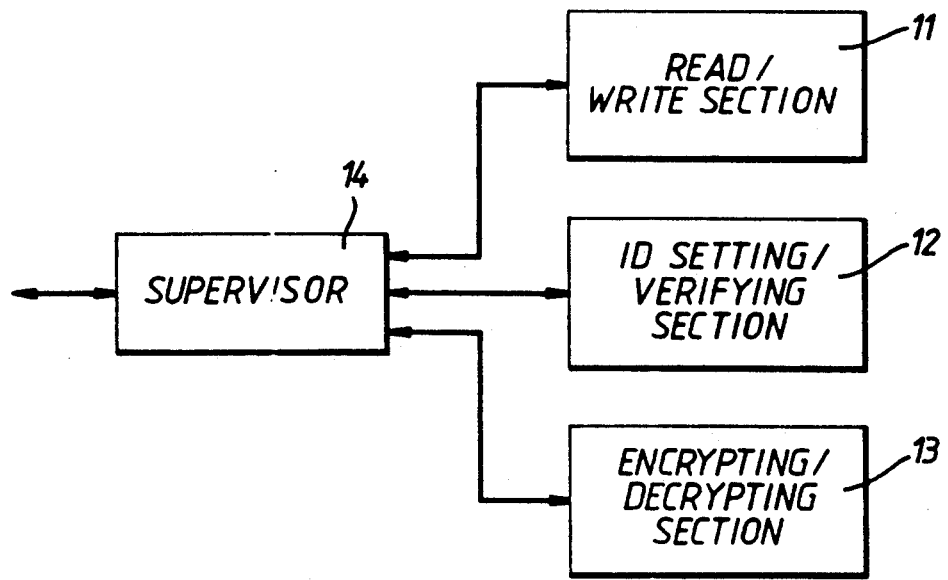
FIG. 2 is a function block diagram of an IC card shown in FIG. 1.

FIG. 2 shows functional blocks for IC card 1. The storage of an identification number, set by the user, is executed in an identification number (ID) setting/verifying section 12. The ID number input by the user when the user uses IC card1I and the ID number which has already been set are collated. If the correct ID number has been input, the operation of a read/write section 11 is permitted. Read/write section 11 executes the reading, writing and erasing of data in a data memory 16 (described later). An encrypting/decrypting section 13 encrypts data read by read/write section 11 and the data are transmitted from CPU 3 to other terminal devices. When encrypted data have been transmitted from other terminal devices, encrypting/decrypting section 13 decrypts these encrypted data. Then these decrypted data are stored in data memory 16 by read/write section 11. The respective functions of read/write section 11, ID setting/verifying section 12 and encrypting/decrypting section 13 are controlled by a supervisor 14. Supervisor 14 executes control by selecting specified functions from these respective functions through function codes input from card reader/writer 2 or function codes to which data have been added.

Figure 3:
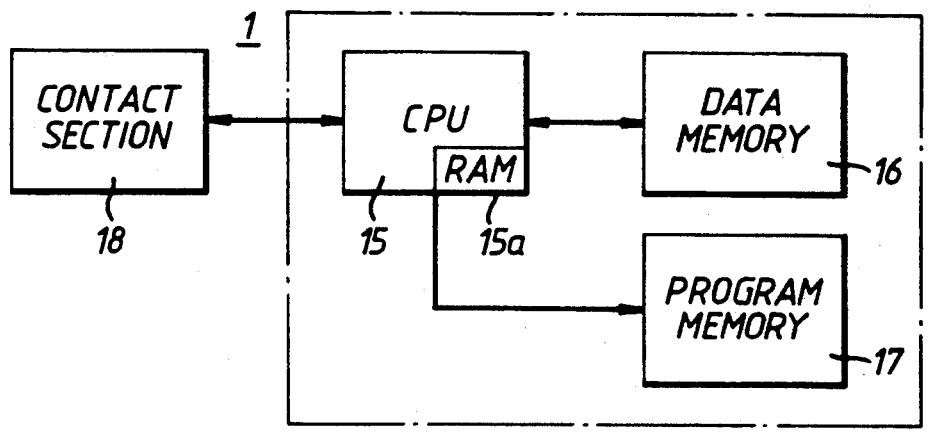
FIG. 3 is a block diagram showing the internal construction of the IC card shown in FIG. 1.

FIG. 3 shows a block diagram of IC card 1. IC card 1 contains a CPU 15 used as a control element. Data memory 16, program memory 17 and contact section 18 are controlled by CPU 15. Among these, data memory 16 is used to store various data and is composed of, for instance, an EEPROM. Program memory 17 is composed of, for instance, a masked ROM, and stores the control program for CPU 15. The writing of various data to data memory 16 and the reading of various data from data memory 16 are executed under the control of CPU 15 using the control program stored in program memory 17. Contact section 18 is for obtaining electrical contact with card reader/writer 2 of terminal device 8 in order to execute access between CPU 15 of IC card 1 and CPU 3 of terminal device 8. The portion within a dotted chain line, CPU 15, data memory 16 and program memory 17, is composed of a single IC chip embedded in the main body of IC card 1.

Figure 4:
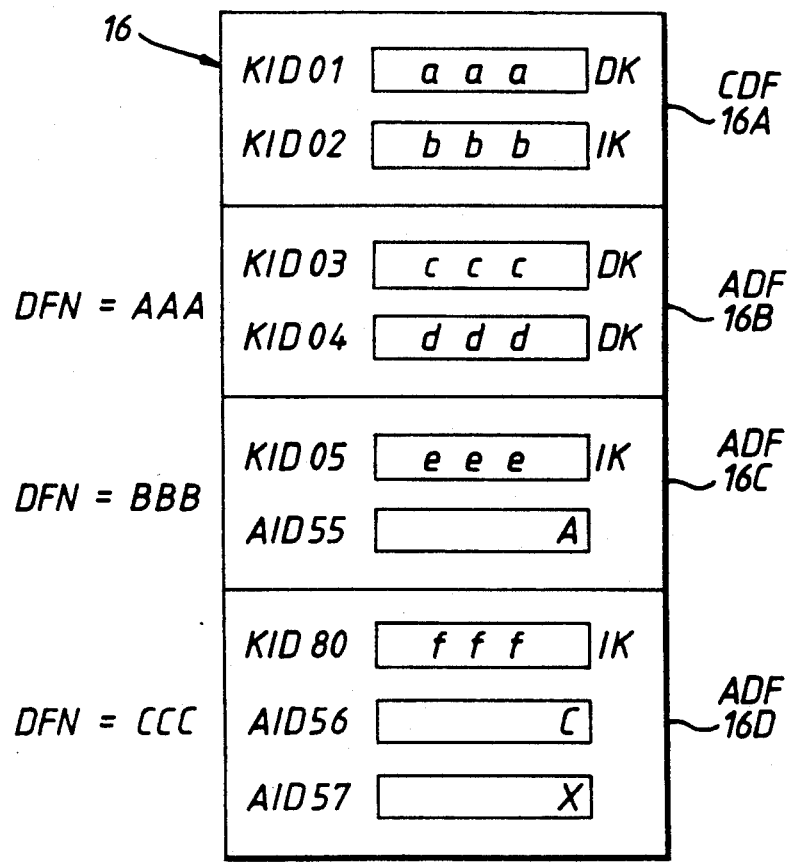
FIG. 4 is a diagram schematically showing memory areas of a data memory in the IC card.

As shown in FIG. 4, for instance, data memory 16 is constituted by a common data file (hereinafter referred to as a CDF) 16A commonly used for all of the applications, and a plurality of application data files (hereinafter referred as ADFS) 16B, 16C and 16D used for respective application and data file names (DFN) are respectively given to the ADFs 16B, 16C and 16D.

In the example in FIG. 4, CDF 16A contains designation key data (DK) aaa indicated by a key data number KIDO1 and internal key data (IK) bbb indicated by a key data number KIDO2, and ADF 16B indicated by DFN=AAA contains designation key data (DK) ccc indicated by a key data number KIDO3 and designation key data (DK) ddd indicated by a key data number KIDO4.

ADF 16C indicated by DFN=BBB contains internal key data (IK) eee indicated by a key data number KIDO5 and a data area indicated by an area number AID55. Particularly, the data area includes attribute information (A) for permitting access when correct authentication is obtained in the authentication process by use of the internal key data (IK) in ADF 16C. Further, ADF 16D indicated by DFN=CCC contains internal key data (IK) fff indicated by a key data number KID80, a data area indicated by an area number AID56 and a data area indicated by an area number AID57. Particularly, the data area indicated by the area number AID56 includes attribute information (C) for permitting access when correct authentication is obtained in the authentication process by use of the internal key data (IK) in CDF 16A. The data area indicated by the area number AID57 includes attribute information (X) for permitting access when correct authentication is obtained in the authentication process by use of the internal key data (IK) in CDF 16A or internal key data (IK) in ADF 16D.

The designation key data (DK) is used by terminal device 8 for authenticating IC card 1, and the internal key data (IK) is used by IC card I for authenticating terminal device 8.

The operation of IC card 1 will now be described with reference to FIGS. 5A to 5E, FIGS. 6A to 6D and 7. When IC card 1 receives a command message shown in FIG. 5A from terminal device 8, IC card 1 executes a mutual authentication preparation flowchart for the IC card and terminal device shown in FIG. 6A based on a function code 21 contained therein. The process is executed by CPU 15 according to the program stored in program memory 17. First, in step ST1, random number data A is generated in terminal device 8 from which data "EXCH (ALG, KID-03, A)" is transmitted to IC card 1. Then, it is determined in step ST1 by referring to selection ADF fixed information in internal RAM 15a of CPU 15 whether or not ADFs 16B to 16D have been selected. At this time, if the selection has not been completed, that is, if "NO" in step ST1, a key data number (KID) 22 of the input command message is detected from CDF 16A in data memory 16 in step ST2. If the selection has been completed, that is, if "YES" in step ST1, the KID 22 is detected in CDF 16A and the selected ADF in step ST3. In step ST3, the random data A is stored in internal RAM 15a of IC card 1. If it is not detected at this time, an error status is transmitted to terminal device 8 in step ST4.

If the KID is detected, corresponding key data is internally read in step ST5 and it is checked whether it is correct or not. At this time, if it is not correct, an error status is transmitted to terminal device 8. If it is correct, random number data A in the area 23 of the command message and the corresponding key data is stored in a specified area in internal RAM 15a of CPU 15 in step ST6. Next, random number data B is generated in step ST7 in accordance with a specified algorithm from this random number data A, the inherent card number which was set at the time of issuing the card and card random number data which was stored beforehand as an initial value in data memory 16, and random number data B is stored into data memory 16 as new card random number data in step ST8.

Then, in step ST9, a check is once more made on whether the ADFs have been selected or not. If they have not been selected, a KID in the internal key data is detected by CDF 16A in the next step ST10. If they have been selected, a KID in the internal key data is detected from CDF 16A and also from the selected ADF in step ST11 (in this case, ADF is the preferential subject). If the KID is not detected, an error status is transmitted to terminal device 8 in the next step ST12. If it is detected, corresponding internal key data is read internally in the next step ST13 and whether the key data is correct or not is checked. At this time, if it is not correct, an error status is transmitted to terminal device 8.

If the key data is correct, step ST14 is effected to encrypt the previously generated random number data B by using the detected internal data ddd as an encryption key, and the result is stored into a specified area of internal RAM 15a as authentication data C2X. Then, the data "EXCH (ALG, KID-04, B)" including the random number data B and KID of the internal key data are transmitted to terminal device 8 in step ST15 and this flow control is completed.

According to the above flow control, key designation data and random number data used for mutual authentication between terminal device 8 and IC card 1 can be commonly used.

In this embodiment, it is a characteristic that, if CPU 15 of IC card 1 detects that the authentication data which has been transmitted from terminal device 8 to IC card 1 is invalid, CPU 15 of IC card 1 does not output authentication data to terminal device 8. Next, this function will now be described with reference to FIG. 6B.

Figure 5A:
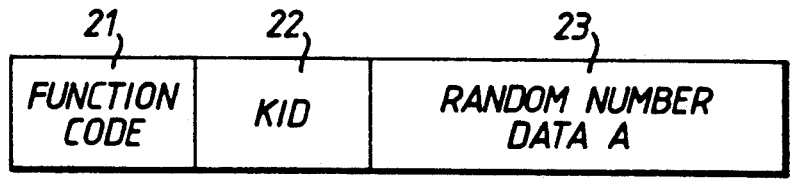
FIGS. 5A to 5E are diagrams showing the formats of various commands transmitted from the terminal device to the IC card.
Figure 5B:
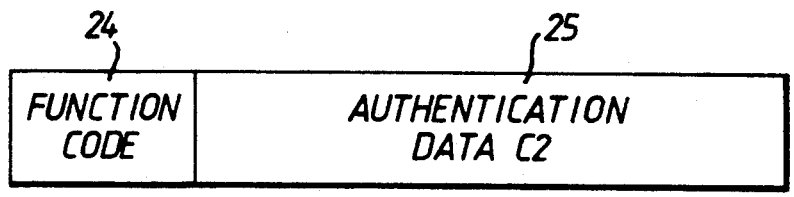
Figure 6A:
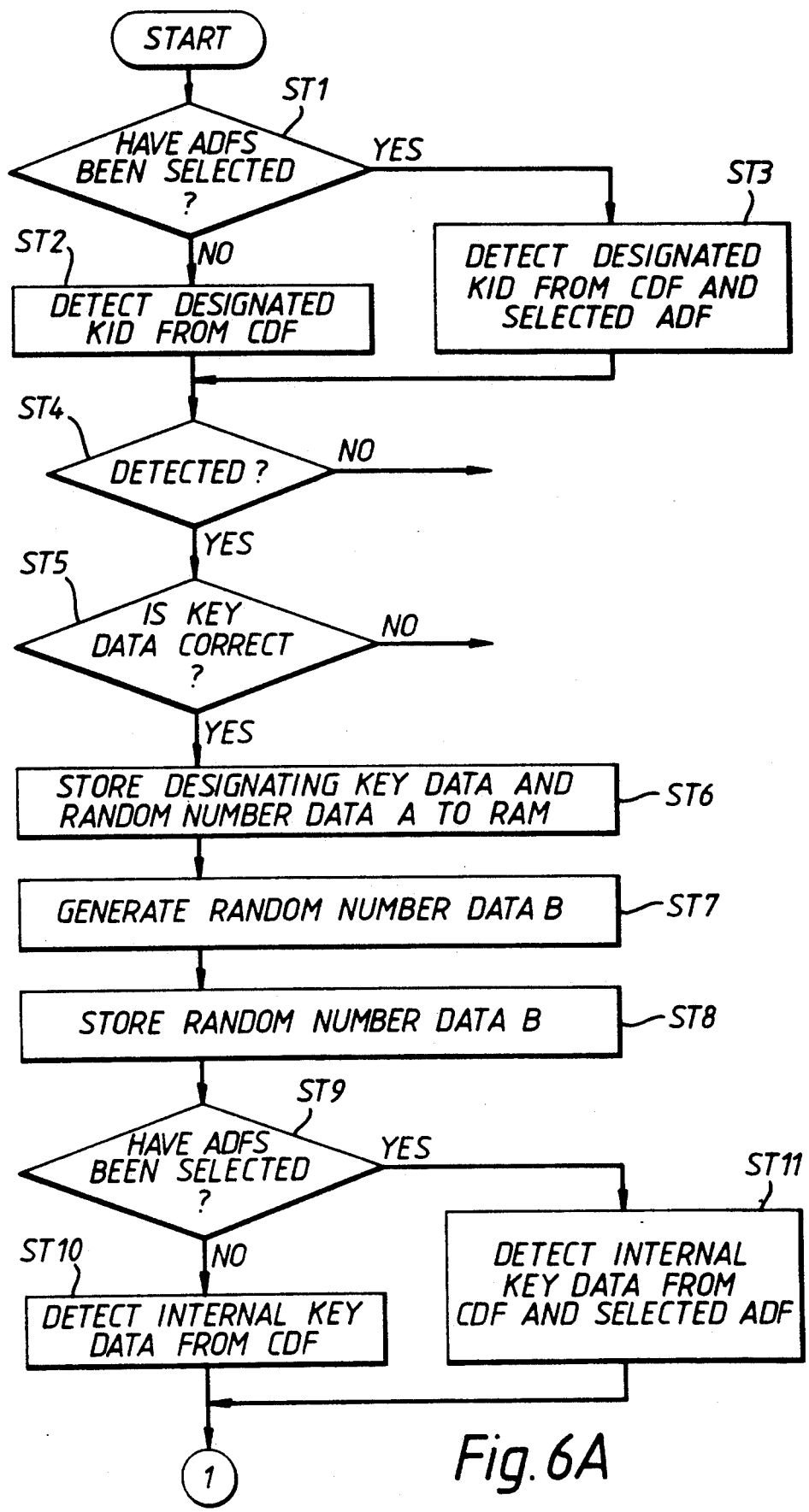
FIGS. 6A to 6D are flowcharts for explaining the operation of the mutual authentication system of the above embodiment.
Figure 6A:
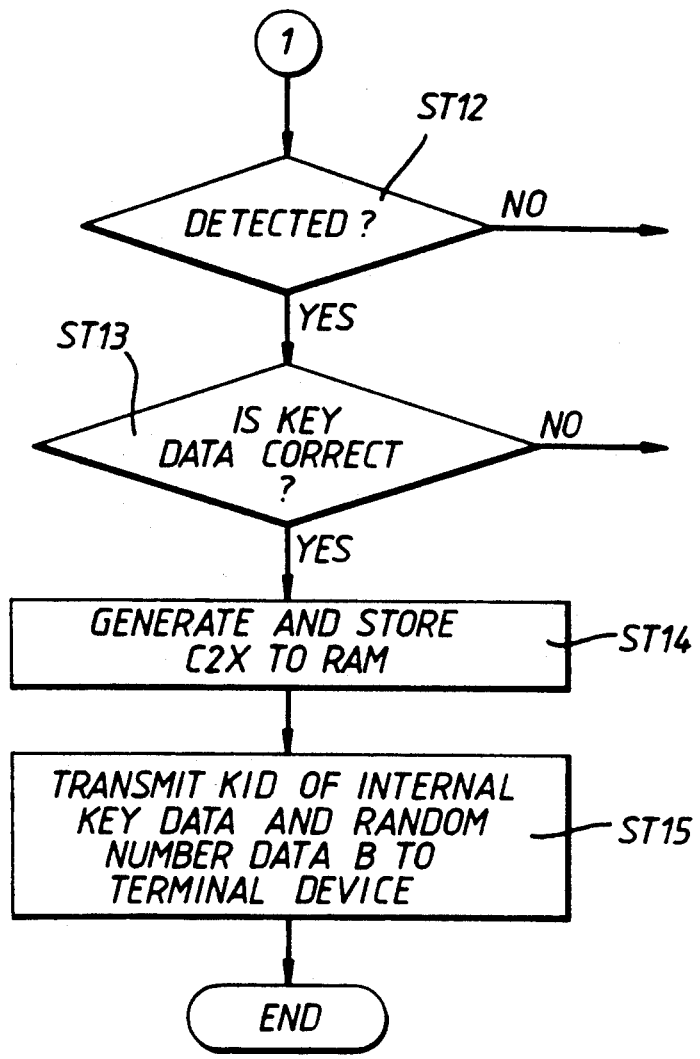
Figure 6B:
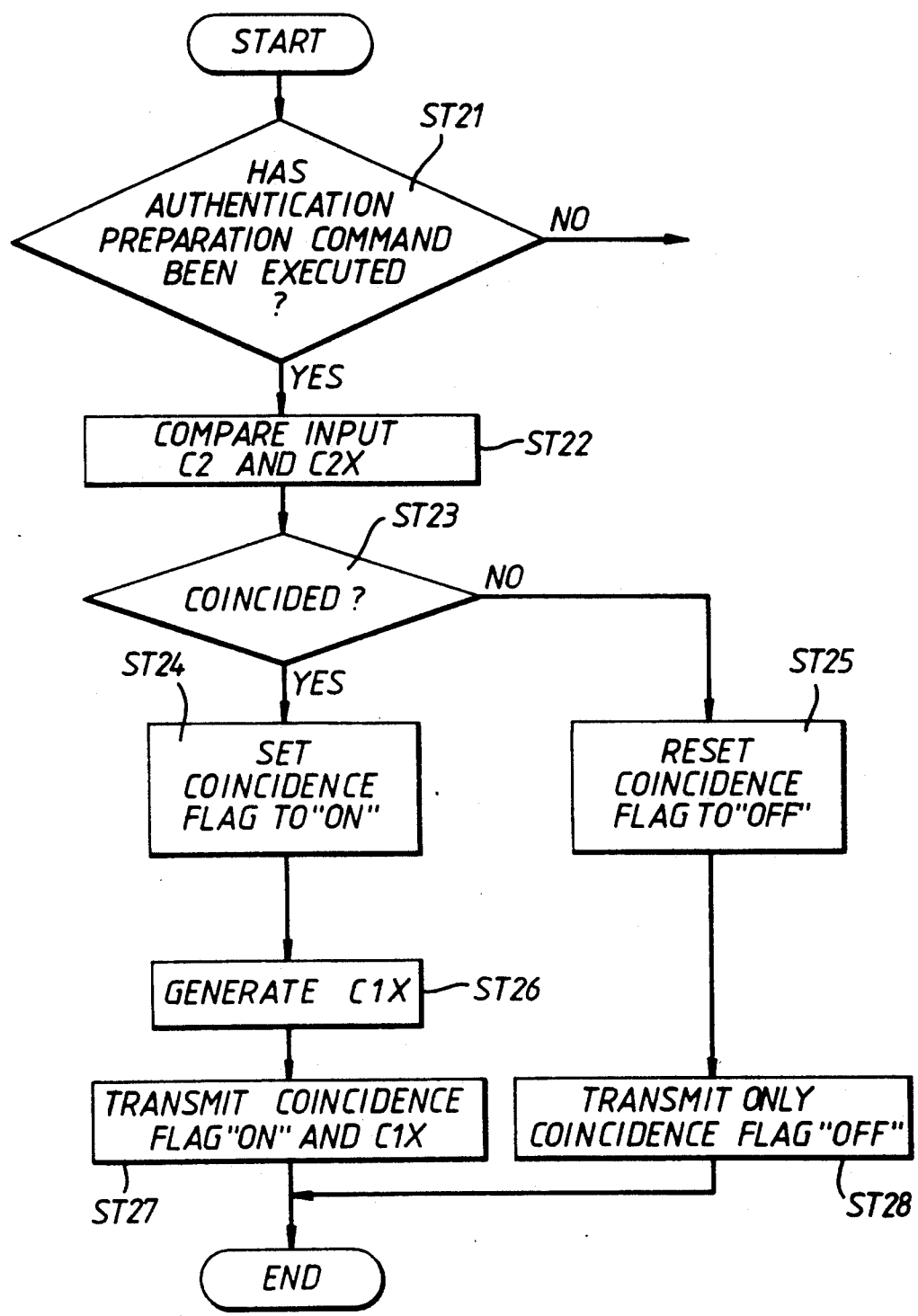

When CPU 15 of IC card 1 receives a command message shown in FIG. 5B, the flow control shown in FIG. 6B is selected according to the function code 24 thereof and effected. That is, first it checks whether the mutual authentication preparation command described above has been executed or not. If it has not been executed, an error status is transmitted to terminal device 8 in step ST21. If the flow in FIG. 6A has already been executed, an encryption of random number data B using key data ddd is excuted in terminal device 8 to obtain ecrypted data as authentication data C2 25 which is then transmitted to IC card 1. In the step ST22, authentication data C2 25 is compared with authentication data C2X which was previously stored in internal RAM 15a. If they coincide with each other in step ST23, a coincidence flag is set to the ON state in the step ST24. If "NO" is obtained in the step ST23, the coincidence flag is set to the OFF state in the step ST25. Here, in these coincidence flags, there are an ADF-corresponding coincidence flag which indicates the authentication result of ADF and a CDF-corresponding coincidence flag which indicates the authentication result of CDF. The ADF-corresponding coincidence flag or the CDF-corresponding coincidence flag is set to the ON or OFF state according to whether the internal key data belongs to ADF or CDF. This coincidence flag is composed of "0" and "1" bit data. By referring to this result, IC card 1 determines whether or not to output authentication data.

If authentication data C2 and authentication data C2X coincide, authentication data C1X is generated by encrypting random number data A previously stored in the internal RAM 15a by using the designation key data ccc as an encryption key in the step ST26. Then, this authentication data C1X and the result of the coincidence flag that "they are in coincidence" are transmitted to terminal device 8 in the step ST27, and this flow control is completed. Also, if authentication data C2 do not coincide with authentication data C2X, only the result of the coincidence flag that "they are not in coincidence" is transmitted to terminal device 8 in the step ST28, and this flow control is completed.

By this means, authentication data C1X used for determining IC card 1 by terminal device 8 is only transmitted to a legitimate terminal device 8. That is, if it is not a legitimate terminal device 8, this non-legitimate terminal device cannot read any data concerning IC card 1. By the above flow control, mutual authentication of IC card I with terminal device 8 can be attained.

Figure 5C:
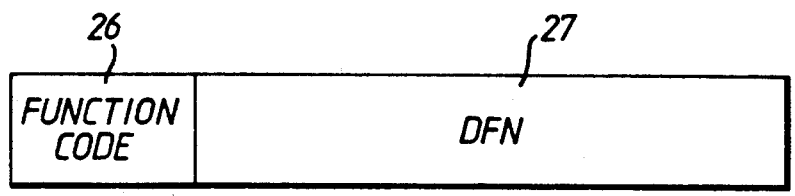
Figure 6C:
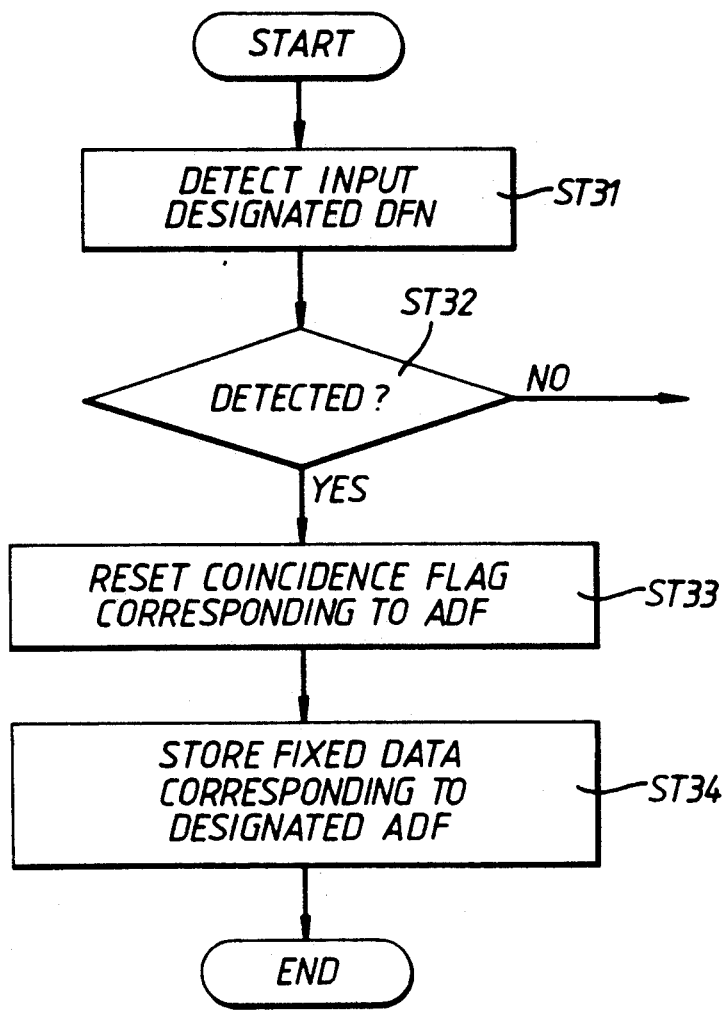

Next, when IC card I receives a command message shown in FIG. 5C from terminal device 8, an ADF selection flow of FIG. 6C is selected according to the function code 26 and effected. First, it is checked in the step ST31 whether DFN 27 included in the message is registered in data memory 16 of IC card 1. If it is not registered, an error status is transmitted to terminal device 8 in the step ST32. If it is registered, the ADF-corresponding coincidence flag among the coincidence flags of the C2/C2X is set to the OFF state in the step ST33. Next, fixed information corresponding to the designated DFN is held in internal RAM 15a in the step ST34 and a correct completion status is transmitted to terminal device 8.

Figure 5D:
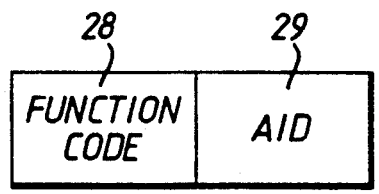
Figure 5E:
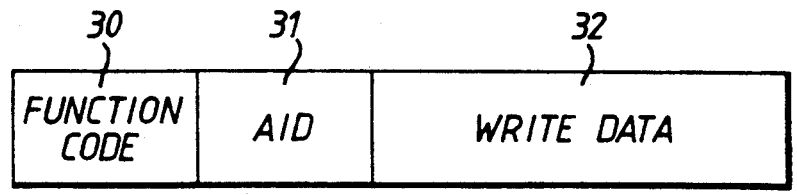
Figure 6D:
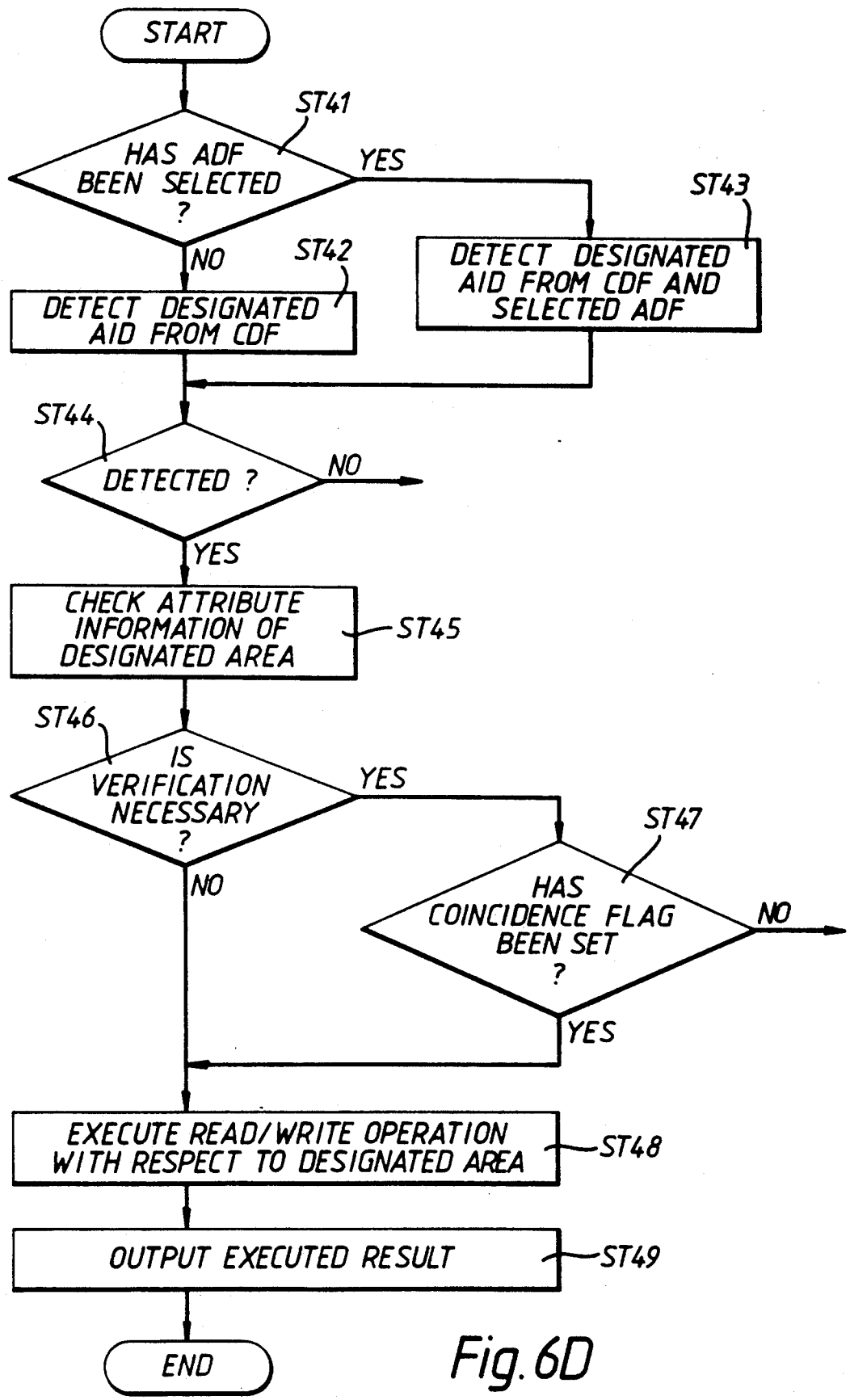
Figure 7:
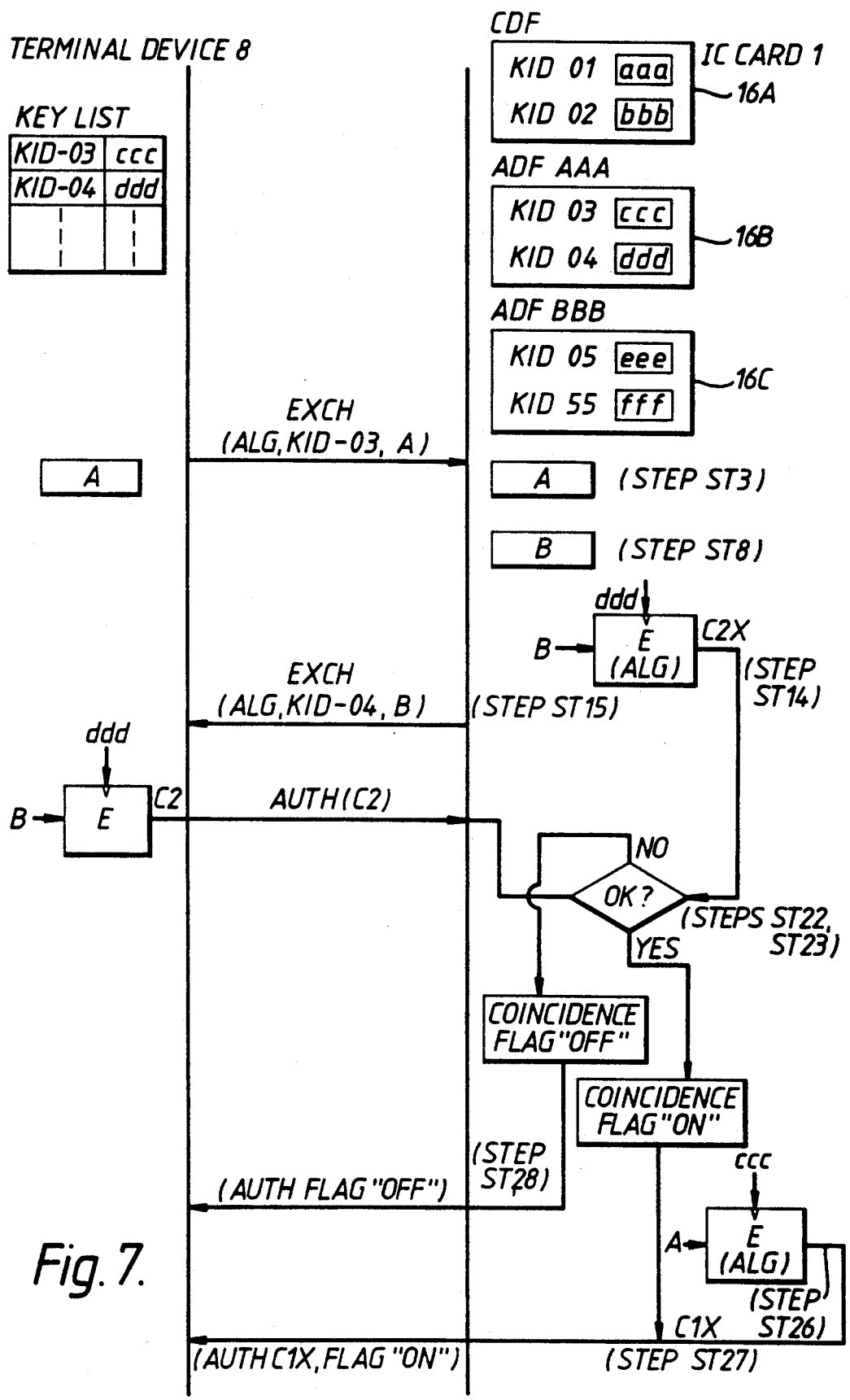
FIG. 7 is a schematic diagram of the mutual authentication system according to the present invention.

Next, when IC card 1 receives a read command message shown in FIG. 5D or write command message shown in FIGURE 5E from terminal device 8, the flow control of FIG. 6D is selected according to the function code 28 or 30 and effected. That is, it is first checked in the step ST41 whether the ADF has been selected or not, and if it has not been selected, an area identification number (AID) 29 or 31 in the input message is detected from CDF 16A in the step ST42. If it has been selected, designated AID is detected in the selected ADF and CDF 16A in the step ST43. At this time, if there is no AID detected, an error status is transmitted to terminal device 8 in the step ST44. If the designated AID is detected, it is checked in the step ST46 whether or not it is necessary to determine the previous coincidence flag by referring to the attribute information stored in the corresponding designated area in the step ST45. If this is necessary, it is determined whether it is an ADF-corresponding coincidence flag or CDF-corresponding coincidence flag, or it can be either of them. If the ADF-corresponding coincidence flag is necessary or if it can be either of them, the ADF-corresponding coincidence flag is referred to and it is checked whether it is set in the ON state or not. If it is set in the OFF state, an error status is transmitted to terminal device 8 in the step ST47. If the CDF-corresponding coincidence flag is necessary or if it can be either of them, the CDF-corresponding coincidence flag is referred to and it is checked whether it is set in the ON state or not. If it is set in the OFF state, an error status is transmitted to terminal device 8 in the step ST47. Then, a corresponding read or write process is effected in the step ST48 according to the function code 28 or 30 in the message and the result of the process is transmitted to terminal device 8 in the step ST49.

Next, the operation of IC card I having the construction of the area and key data shown in FIG. 4 is explained. In FIG. 4, the memory areas are arranged as described before, and in this state, key data of KID01 is used as designating key data and key data of KID 02 is used as internal key data for mutual authentication in the case where the ADF selection is not effected.

In a case where the ADF 16B is selected by DFN=AAA, key data of KIDO3 or KIDO4 or key data of KIDO1 is used as designating key data and key data of KIDO2 is used as internal key data.

Likewise, in a case where the ADF 16C is selected by DFN=BBB, key data of KIDO1 is used as specifying key data and key data of KIDO5 is used as internal key data.

In order to make access to the area of AID55 in the ADF 16C, the attribute of the area is so determined as to necessitate internal key data in the ADF. Therefore, the mutual authentication must be effected after ADF 16C is selected. If the mutual authentication is effected before ADF 16C is selected, even if the mutual authentication is effected, ADF 16C cannot be accessed since the internal key data KIDO2 in CDF 16A is used.

Further, for access to the area of AID56 in ADF 16D, the attribute of the area is so determined as to necessitate internal key data in CDF 16A. Therefore, after the mutual authentication is effected by using key data KIDO2 in CDF 16A, ADF 16D must be selected and access will be made to the data area indicated by the area number AID56. Thus, if the CDF-corresponding coincidence flag is set in the ON state, access is available.

Concerning the area of AID57, internal key data are not required. Thus, access is available even if ADF 16D is selected after mutual authentication in which key data KIDO2 in CDF 16A are used or on the contrary, even after mutual authentication has been executed by key data KID80 in ADF 16D has been selected. Therefore, access to the area of AID57 cannot be made in a case where ADF 16C is first selected and then ADF 16D is selected after the mutual authentication is effected.

In this way, determination is made as to whether the key data used for authentication are common data file (CDF) data or are application data file (ADF) data. If they are application data file (ADF) data, the authentication result of the application data file is cleared during application data file is selected. By this means, every application data file holds its own different key data and authentication is effected with these key data. Thus, security preservation which is established by deciding the availability of access to the data memory can be executed while maintaining security between application data files.

According to the present invention, when executing mutual authentication between a terminal device and an IC card, the mutual authentication data for determining the legitimacy of the IC card in respect of the terminal device cannot be transmitted from the IC card as long as the terminal device is not determined as legitimate by the IC card. By this means, the authentication code is not transmitted from the IC card to a terminal device which is not legitimate. Thus, the security of the authentication data of the IC card can be increased.

What is claimed is:

1. A mutual authentication system for authenticating a first electronic device and a second electronic device by transmitting authentication data between the first and second electronic devices, comprising:
   first transmission means for transmitting a first authentication data from the second electronic device to the first electronic device;
   determination means, provided in the first electronic device, for determining the legitimacy of the second electronic device based on the first authentication data transmitted from the second electronic device by the first transmission means;
   second transmission means for transmitting a second authentication data, which is used for determining the legitimacy of the first electronic device, from the first electronic device to the second electronic device when the second electronic device is determined to be legitimate by the determination means.
   inhibition means for inhibiting the operation of the second transmission means, including inhibiting transmission of the second authentication data, when the second electronic device is determined not to be legitimate by the determination means.

2. A mutual authentication system as in claim 1, wherein the first electronic device is a portable electronic device having a contact section for electrically communicating with the second electronic device.

3. A mutual authentication system as in claim 2, wherein the second electronic device is a terminal device for electrically communicating with the portable electronic device.

4. A mutual authentication system as in claim 1, wherein the first transmission means comprises a card reader/writer in the second electronic device which communicates with a contact section in the first electronic device.

5. A mutual authentication system as in claim 1, wherein the determination means includes means for comparing the first authentication data with data stored in the first electronic device.

6. A mutual authentication method for authenticating a first electronic device and a second electronic device by transmitting authentication data between the first and second electronic devices, comprising the steps of:
   transmitting a first authentication data from the second electronic device to the first electronic device;
   determining the legitimacy of the second electronic device based on the first authentication data transmitted from the second electronic device;
   transmitting a second authentication data, which is used for determining the legitimacy of the first electronic device, from the first electronic device to the second electronic device when the second electronic device is determined to be legitimate by the determining step; and
   inhibiting the transmitting of the second authentication data when the second electronic device is determined not to be legitimate by the determining step.

7. A mutual authentication as in claim 6, wherein the step of determining the legitimacy of the second electronic device includes comparing the first authentication data with data stored in the first electronic device.

8. A mutual authentication method as in claim 6, wherein the step of inhibiting includes the step of sending an indication from the first electronic device to the second electronic device when the second electronic device is determined not to be legitimate.

9. A mutual authentication method for transmitting authentication data between the first and second electronic devices for authenticating with each other, comprising the steps of:
   transmitting first data and first designate data designating first key data to the first electronic device from the second electronic device;
   transmitting second data and second designate data designating second key data to the second electronic device from the first electronic device;
   generating first authentication data based on the second data and the second designate data in the first electronic device;
   generating second authentication data based on the received second data and the second designate data in the second electronic device and transmitting the second authentication data to the first electronic device;
   comparing the first authentication data with the second authentication data transmitted from the second electronic device in the first electronic device;
   generating third authentication data based on the first data and the first designate data in the first electronic device;
   transmitting the third authentication data and third data indicating that the first authentication data coincides with the second authentication data from the first electronic device to the second electronic device when the first authentication data coincides with the second authentication data in the comparing step; and transmitting fourth data indicating that the first authentication data does not coincide with the second authentication data from the first electronic device to the second electronic device when the first authentication data does not coincide with the second authentication data in the comparing step.

10. A mutual authentication method as in claim 9, wherein the first electronic device includes storing means having memory areas divided corresponding to application objects thereof for storing key data corresponding to the divided areas.

11. A mutual authentication method as in claim 10, further comprising the step of controlling reading and writing operations with respect to the divided areas of the storing means based on a comparison result of the comparing step.

12. A mutual authentication method as in claim 10, wherein the storing means stores the first key data and the second key date into the each of memory areas.

13. A mutual authentication system for authenticating a first electronic device and a second electronic device by transmitting authentication data between the first and second electronic devices, comprising:

first transmission means for transmitting a first authentication data from the second electronic device to the first electronic device;

determination means, provided in the first electronic device, for determining the legitimacy of the second electronic device based on the first authentication data transmitted from the second electronic device by the first transmission means;

second transmission means for transmitting a second authentication data, which is used for determining the legitimacy of the first electronic device, from the first electronic device to the second electronic device when the second electronic device is determined to be legitimate by the determination means; and third transmission means for transmitting a determination result data from the first electronic device to the second electronic device when the second electronic device is determined not to be legitimate by the determination means, the determination result data indicating that the second electronic device is not legitimate.

14. A mutual authentication method for authenticating a first electronic device having a determination means and a second electronic device by transmitting authentication data between the first and second electronic devices, comprising the steps of:

transmitting a first authentication data from the second electronic device to the first electronic device;

determining, by the determination means in the first electronic device, the legitimacy of the second electronic device based on the first authentication data transmitted from the second electronic device;

transmitting a second authentication data, which is used for determining the legitimacy of the first electronic device, from the first electronic device to the second electronic device when the second electronic device is determined to be legitimate by the determining step; and transmitting a determination result data from the first electronic device to the second electronic device when the second electronic device is determined not to be legitimate by the determining step, the determination result data indicating that the second electronic device is not legitimate.

* * * * *